United States Patent

[11] 3,578,994

[72] Inventor Frank Massa
Cohasset, Mass.
[21] Appl. No. 868,332
[22] Filed Oct. 22, 1969
[45] Patented May 18, 1971
[73] Assignee Massa Division, Dynamics Corporation of America
Hingham, Mass.

[54] PIEZOELECTRIC CLAMPED-FREE BEAM TYPE TRANSDUCER
7 Claims, 12 Drawing Figs.
[52] U.S. Cl. .................................................. 310/8.6, 310/8.5, 310/9.6, 310/9.8
[51] Int. Cl. .................................................. H01v 7/00
[50] Field of Search .................................................. 310/8.6, 8.5, 8.1, 8.2, 8.3, 9.6, 9.8

[56] References Cited
UNITED STATES PATENTS

| | | | |
|---|---|---|---|
| 2,944,117 | 7/1960 | Gray | 310/9.6X |
| 1,803,273 | 4/1931 | Sawyer | 310/9.8X |
| 2,271,200 | 1/1942 | Mason | 310/8.2X |
| 3,500,451 | 3/1970 | Yando | 310/9.6X |
| 1,802,782 | 4/1931 | Sawyer | 310/8.6 |
| 3,381,149 | 4/1968 | Wiggins et al. | 310/8.6 |
| 3,247,404 | 4/1966 | Batsch | 310/8.6 |
| 2,900,536 | 8/1959 | Palo | 310/9.6 |

Primary Examiner—Milton O. Hirshfield
Assistant Examiner—B. A. Reynolds
Attorney—Louis Bernat ABSTRACT: A transducer cartridge carries a miniature video recording head on a tiny vibrating platform. The platform is at the end of a piezoelectric reed which undertakes mechanical excursions responsive to an electrical signal. Various designs are illustrated which have been built and found to be satisfactory for use with a home video tape recorder.

Patented May 18, 1971
3,578,994
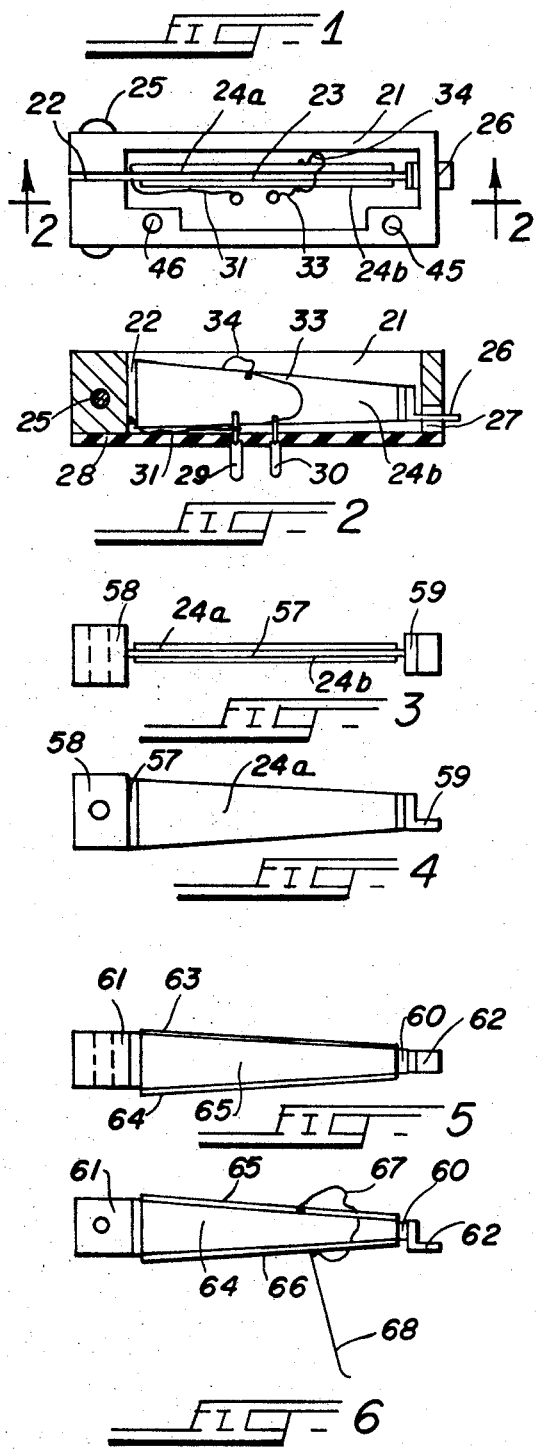
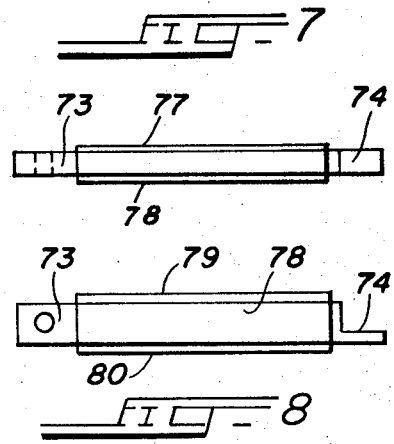
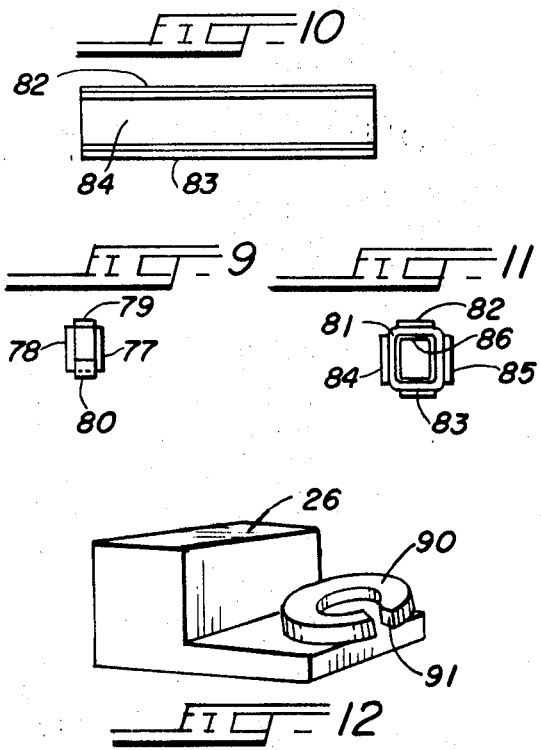
INVENTOR.
FRANK MASSA

PIEZOELECTRIC CLAMPED-FREE BEAM TYPE TRANSDUCER

This invention relates to transducers, and more particularly to low-cost transducers for converting alternating electrical signals into corresponding mechanical vibrations.

The primary purpose of the invention is to control the position of a tiny platform at some point in space. The controlled point could have several different objectives. In one case, perhaps there is a need for a stable positioning, in which case a suitable feedback could cause the platform to be moved back to normal when any vibration occurs so that the platform is stationary. In another case, perhaps there is need for vibration, in which case the platform is vibrated according to some predetermined signal.

For example, one of many uses might be in connection with a magnetic tape recorder. Here, the platform carries a miniature magnetic recording head. The platform is vibrated responsive to a signal, such as a TV signal, for example, and the resulting vibration of the recording gap will record a corresponding track on the tape.

While the following description refers to a piezoelectric transducer for controlling the platform position, it should be understood that other transducers could also be noted. For example, magnetostrictive units could be used.

Accordingly, an object of the invention is to provide a new and improved electromechanical transducer. A further object is to control a platform at a point in space. Here, an object is to vibrate the point responsive to a predetermined signal.

Another object of my invention is to provide an electromagnetic transducer comprising a vibratile member clamped at one end and free at the opposite end.

Still another object of my invention is to provide an integrated housing and clamping structure for the vibratile reed to enable a low-cost assembly for the transducer.

A further object of my invention is to provide a simple molded plastic structural member containing a relatively rigid base section with an elongated vibratile portion extending outwardly from the base section with a tiny platform at the free end of the vibratile element.

In keeping with an aspect of the invention, these and other objects are accomplished by a piezoelectric bilaminar structure which is bonded to a reed or rod-shaped structural member. That member is clamped at one end and free to vibrate at the other end. In another embodiment of my invention, a vibratile rod is clamped at one end and free to vibrate at the other end. The rod is provided with a bilaminar piezoelectric plate bonded to the opposite pairs of right angle faces. Energization of the plate with, say, a TV signal, causes oscillations of the free end which may be produced in both right angle planes. In a still other illustrative embodiment of my invention, I utilize a polarized tubular ceramic element having either continuous or separated electrode surfaces on the inside wall. The electrode applied to the outside wall of the tube is separated so that four longitudinal, electrically independent, electrodes are provided along the outer surface of the tube. The particular structures to be described hereinafter are all illustrative of a low-cost transducer system which permits the controlled electromechanical vibration of a recording device such as a tiny recording head for recording video signals on a magnetic tape.

The novel features of my invention, both as to organization and method of operation, as well as additional objects and advantages thereof, will best be understood from the following description of several inventive embodiments when read in connection with the accompanying drawings, in which:

FIG. 1 is a plan view illustrating one embodiment of my invention using a piezoelectric driven reed;

FIG. 2 is a second elevation view taken along the line 2–2 of FIG. 1;

FIG. 3 shows a top plan view of one form of vibratile structure in which a basic vibratile frame has piezoelectric plates bonded thereto for establishing the desired vibratory motion;

FIG. 4 is a side elevation view of the structure of FIG. 3;

FIG. 5 is a top plan view of an embodiment of the structure of FIG. 3, in which piezoelectric plates are bonded to four sides of the vibratile elements to control vibrations of the tip in two right angle planes;

FIG. 6 is a side elevation view of the structure illustrated in FIG. 5;

FIG. 7 is a top plan view of still another embodiment of my invention in which a rectangular rod is provided with piezoelectric plates along its four surfaces for controlling mechanical vibrations, at the free end, in two right angle planes;

FIG. 8 is a side elevation view of the construction illustrated in FIG. 7;

FIG. 9 is an end view of the structure illustrated in FIG. 8;

FIG. 10 is a side view of still another embodiment of my invention showing a polarized ceramic tube with electrodes bonded to its outer surfaces;

FIG. 11 is an end view of the polarized ceramic tube illustrated in FIG. 10; and FIG. 11 is an end view of the polarized ceramic tube illustrated in FIG. 10, and FIG. 12 shows a magnetic head on the tiny platform.

The embodiment of FIG. 1 illustrates a framelike housing structure 21 which contains a slot at one end. The base end 22 of a flat, reedlike member 23 is fitted into the slot. The reed member 23 is considered to be an electrically conducting metal vane. The base portion of the reed 23 is clamped between the faces of the slotted frame by means of the rivet 25.

Bonded to the opposite surfaces of reed 23 are two thin polarized ceramic plates 24a and 24b, as illustrated in FIGS. 1 and 2. These polarized ceramic plates may be barium titanate, lead zirconate titanate, or any other well known transducer material. Preferably, the bonding of the ceramic plates may be effected by employing a conductive epoxy cement which establishes electrical contact between the inside surfaces of the ceramic plates 24a and 24b and the electrically conducting reed 23. If the reed 23 is made of a nonconductive material, such as plastic, a thin piece of conducting foil may be placed against the inside surfaces of the ceramic plates 24a and 24b prior to their attachment to the member 23. Electrical connection for the inside surfaces of the ceramic plates may be made to the electrically conducting foils.

A tiny platform 26 is attached to the free end of the reed member 23. An undercut portion 27 is provided in the bottom of the frame member 21 in the vicinity of the platform 26 to enable a vibratory motion of the platform structure, when required. A thin insulating plate 28 carries the electrical connector pins 29 and 30 and is cemented to the bottom of the frame member 21.

An electrical conductor 31 connects from the reed or metallic vane 23 to the pin 29, and another electrical conductor 33 connects the electrical pin 30 to the outer surface of the piezoelectric ceramic element 24a. An electrical conductor 34 connects the outer electrode surface of the piezoelectric ceramic 24b to the outer electrode surface of the ceramic 24a. The electrical polarization and the phase relationships of the ceramic plates will be additive for the parallel connection illustrated; but they will not be described herein, because it is well known in the art to use them in connection with bilaminar structures such as phonograph pickups.

Two holes 45 and 46 may be used for mounting the transducer. If desired, a thin lid or plate (not shown) may be cemented to the top surface of the frame 21 to act as a dust shield. This lid could also serve as a nameplate to identify the transducer assembly.

FIGS. 3 and 4 illustrate a second embodiment of my invention. The vibratile portion of the transducer in FIG. 3 includes a reed portion 57 which is combined with a relatively massive base portion 58 at one end and the vibratile platform portion 59 at the other end. The ceramic elements 24a and 24b are bonded to the flat reed portion 57 in the manner described in connection with FIGS. 1 and 2. The vibratile structural member 57 may be made of conducting materials (such as diecast aluminum) or of nonconducting materials (such as molded bakelite). In either case, the electrical connections may be achieved with conducting cement for the inner surfaces of the ceramic plates, as described in connection with FIGS. 1 and 2. The outer electrode surfaces of the ceramic elements are electrically connected as shown in FIG. 1. The assembled vibratile element of FIG. 3 may be substituted for the vibratile element in FIG. 1 merely by accommodating the size of the slot 22 in the frame member 21 to the width of the base member 58.

The vibratile element illustrated in FIGS. 5 and 6 includes a tapered rod portion 60 which is terminated at the large end by a base structure 61. The small end of the tapered rod is terminated by the tiny platform 62 which is similar to the platforms 59 and 26. Tapered polarized piezoelectric ceramic plates 63 and 64 are attached at the opposite side surfaces of the tapered rod 60. An additional pair of tapered polarized ceramic plates 65 and 66 are bonded to the top and bottom surfaces of the tapered rod 60.

For the construction shown in FIGS. 5 and 6, the internal electrode surfaces of the four ceramic plates 63—66 are connected together at a common electrical potential. The electrode surfaces of the ceramic plates 63 and 64 are connected together in the same way that the electrical connections were made in FIG. 1 for the outside surfaces of the ceramic elements 24a and 24b. Another electrical connection is made to the outer electrode surfaces of ceramic plates 65 and 66, by the electrical conductors 67 and 68. The polarization of the four plates is such that, when alternating current is applied between the common inside electrode and the electrical conductor 68, the tip 62 will move up and down. When alternating current is connected between the common inner electrical connection and the common connection to the outer electrode surfaces of ceramic plates 63 and 64, the vibration of the tip 62 will be from side to side in the view of FIG. 5.

FIGS. 7, 8, and 9 illustrate a simpler embodiment of the structure described in FIG. 5 and 6. In this embodiment, a rectangular rod 73 is machined at one end to provide a flat platform surface 74. Polarized ceramic plates 77 and 78 are bonded to the opposite side faces of the rod 73. Polarized ceramic plates 79 and 80 are bonded to the opposite parallel surfaces of the rod 73. The structure described in FIGS. 7, 8, and 9 performs identically to the structure shown in FIGS. 5 and 6, except for the difference in resonant frequency and stiffness which is determined by the cross-sectional dimensions of the rod 73.

FIGS. 10 and 11 show a simple polarized ceramic tube which may be used as the vibratile element to replace the previously described structural elements as illustrated in FIGS. 5 or 7. A piezoelectric ceramic tube 81, having a generally rectangular cross section, is provided with a common electrode 86 attached to its inner wall surface and four independent longitudinal electrodes 82, 83, 84 and 85 associated therewith, as shown.

During polarization of the ceramic element 81, a polarizing DC potential may be applied between electrodes 82 and 83 with a center tap across the DC polarizing voltage applied to the center electrode 86. Then, an AC potential between the common center electrode 86 and the outer pair of electrodes 82, 83 causes vertical oscillations of one end of the tube when the opposite end is clamped, in a manner described in connection with FIG. 6 and when an alternating potential is applied between the common electrodes 85 and 86.

Similarly, a DC polarization may be applied between the electrodes 84 and 85 with a center tap from the polarizing potential connected to the common inside electrode 86. After polarization, if the electrodes 84, 85 are commonly connected to one side of an alternating current source and the other side is connected to electrode 86, horizontal vibrations of one end of the tube will result when the opposite end is clamped.

These particular manners of polarizing the ceramic element are not part of this invention, but are described here only to illustrate one possible means for obtaining parallel operation of the electrode surfaces. A further description of the particular polarizing method employing a center tap connection to the common electrode is shown and described in connection with FIG. 10 of U.S. Pat. No. 3,128,532.

If a length of polarized ceramic tube (as illustrated in FIG. 10) is provided with a platform support member at one end and if the opposite end of the tube is clamped to a rigid frame, the simple tubular section will serve the same function as the structural elements previously described in FIGS. 5 and 7.

The platform may have many uses. However, so that the record may be complete, FIG. 12 shows a platform 26 having an annular permanent magnet 90 mounted thereon. The annulus is cut at 91 to provide a recording gap. When a magnetic tape is drawn across the gap while the transducer is vibrating, the flux at the gap records a track on the tape which may later be picked up, played back, and reproduced.

While several specific embodiments of the present invention are shown and described, it will, of course, be understood that various modifications and alternative constructions may be made without departing from the true spirit and scope of the invention. Therefore, the appended claims are intended to cover all such equivalent constructions falling within the true spirit and scope of the invention.

I claim:

1. An electromechanical transducer comprising an elongated inert structural member, characterized in that said structural member is rectangular in cross section and further characterized in that flat strips of piezoelectric material are bonded to all four longitudinal surfaces of said structural member, one end of said elongated member being terminated in a platform, means associated with said elongated structural member to set said platform into transverse vibration at right angles to the longitudinal axis of said elongated structural member, said last named means comprising elongated piezoelectric transducer elements mounted on said elongated member, said transducer elements being characterized in that their length dimension is subjected to alternating mechanical changes corresponding to the magnitude of alternating electrical current supplied to said transducer elements, and magnetic recording means carried by said platform for recording the vibrations produced by said mechanical changes.

2. The invention in claim 1 further characterized in that opposite pairs of said strips of piezoelectric material are connected to operate together and further characterized in that alternating current means supplies either of said pairs, one piezoelectric strips of the pair expanding at the same instant when the other piezoelectric strip of the pair contracts whereby flexural vibration results at said tip terminated end of said structural member in a plane containing said opposite pair of connected piezoelectric strips.

3. In combination in an electromechanical transducer, an elongated inert structural element having a base end and a vibratile tip end, said elongated structural element having four flat surfaces arranged rectangularly around its periphery, four flat elongated piezoelectric transducer elements bonded, one to each of said flat surfaces on said elongated inert structural element, and electrical connection means extending to each of said transducer elements, said transducer elements being characterized in that the length dimension of said transducer elements changes responsive to an application of alternating current to said electrical connection means.

4. A clamped-free cantilever beam having a cross section with coordinate major and a minor axes, at least one electrical-to-mechanical transducer means associated with each coordinate axis of said cross section for causing independently controlled motion along the length of said beam in each of said axes, and means supported by the free end of said beam for tracing a path in space responsive to selective energization of said transducer means.

5. The clamped-free beam of claim 4 and means for magnetically recording a track corresponding to said path in space.

6. The clamped-free beam of claim 4 wherein said major and minor axes have equal length.

7. The clamped-free beam of claim 4 wherein said cross section is rectangular.